United States Patent [19]

Ishikawa

[11] Patent Number: 5,142,630
[45] Date of Patent: Aug. 25, 1992

[54] SYSTEM FOR CALCULATING BRANCH DESTINATION ADDRESS BASED UPON ADDRESS MODE BIT IN OPERAND BEFORE EXECUTING AN INSTRUCTION WHICH CHANGES THE ADDRESS MODE AND BRANCHING

[75] Inventor: Sakou Ishikawa, Hadano, Japan
[73] Assignee: Hitachi, Ltd., Tokyo, Japan
[21] Appl. No.: 340,084
[22] Filed: Apr. 18, 1989

[30] Foreign Application Priority Data
Apr. 20, 1988 [JP] Japan ............... 63-97498

[51] Int. Cl.⁵ ............... G06F 12/00; G06F 12/02
[52] U.S. Cl. ............... 395/375; 364/DIG. 1; 364/245.1; 364/245; 364/245.2; 364/254.9; 364/255.1; 364/254.8; 364/247
[58] Field of Search ............... 395/375; 364/200 MS File, 900 MS File

[56] References Cited

U.S. PATENT DOCUMENTS

| | | | |
|---|---|---|---|
| 3,725,868 | 4/1973 | Malmer et al. | 364/200 |
| 3,818,460 | 6/1974 | Beard et al. | 364/200 |
| 4,616,313 | 10/1986 | Aoyagi | 364/200 |
| 4,752,873 | 6/1988 | Shonai et al. | 364/200 |
| 4,758,949 | 7/1988 | Wada et al. | 364/200 |
| 4,868,740 | 9/1989 | Kagimasa et al. | 364/200 |
| 4,979,098 | 12/1990 | Baum et al. | 364/200 |

FOREIGN PATENT DOCUMENTS 62-11939 1/1987 Japan .

Primary Examiner—Thomas C. Lee
Assistant Examiner—Mehmet Geckil
Attorney, Agent, or Firm—Antonelli, Terry, Stout & Kraus

[57] ABSTRACT

In a data processing unit having an instruction precontrol function, when an instruction for new address mode setting, branch address generation and branching is decoded in a preexecution cycle of the instruction, a branch destination address is calculated by using an address mode of the branch destination address represented by a specific bit in operand data of the instruction, as the address mode, and the branch destination instruction is fetched based on the calculated address.

5 Claims, 2 Drawing Sheets

5,142,630

SYSTEM FOR CALCULATING BRANCH DESTINATION ADDRESS BASED UPON ADDRESS MODE BIT IN OPERAND BEFORE EXECUTING AN INSTRUCTION WHICH CHANGES THE ADDRESS MODE AND BRANCHING

BACKGROUND OF THE INVENTION

The present invention relates to an instruction precontrol system for a data processing unit, and more particularly to a data processing unit having an instruction precontrol function which is suitable in executing a mode set/unconditional branch instruction (BSM instruction) and a mode set/unconditional branch/link instruction (BASSM instruction).

When the memory capacity in a general purpose data processing unit has been increased, a 24-bit operand address is no longer large enough. An architecture which can process an operand address of 31 bits or more is adopted. In this case, it is necessary that a program resource of the 24-bit architecture can also be used as desired. To this end, the data processing unit for this purpose is provided with the mode set/unconditional branch instruction (BSM instruction) and the mode set/unconditional branch/link instruction (BASSM instruction) to allow switching of the address mode between 24 bits mode and 31 bits mode.

The BSM instruction allows setting of a new address mode in an address mode bit of a program status word (PSW) and execution of a program by unconditional branch in the new address mode. The BASSM instruction has, in addition to the function of the BSM instruction, a link function to allow return to the original program when a branched program has been executed. By the provision of the BSM instruction or the BASSM instruction, program resources of different address modes can be executed in one data processing unit.

FIG. 2 shows the format of the BSM and the BASSM instructions. Since the BSM instruction and the BASSM instruction are identical except for the link function, only the BSM function is explained here. In FIG. 2, when an operation code indicates the BSM instruction code, a content of an address mode bit in a current PSW is loaded to a bit 0 position of a general purpose register designated by an R1 field in a register field of the instruction. Then, a content of a bit 0 position of a general purpose register designated by an R2 field is newly set to an address mode bit of the PSW, and a branch address is generated based on the content of the bits 1-31 of that general purpose register and it is set into a program counter. The branch address is calculated in the following manner. When the newly set address mode bit is "0" (which indicates the 24-bit architecture), the branch address is equal to the content of the bits 8-31 of the general purpose register designated by the R2 field with 0's being added to the high order 8 bits. When the newly set address mode bit is "1" (which indicates the 31-bit architecture), the branch address is equal to the content of the bits 1-31 of the general purpose register designated by the R2 field with 0's being added to high order 1 bit.

In the data processing unit having the instruction precontrol function, the calculation of the branch address is carried out in a preexecution cycle in accordance with the current address mode designated by the PSW. Accordingly, if the address mode of the PSW in the preexecution cycle and the address mode newly set in the PSW in the execution cycle of the instruction are different, it is necessary to provide an operand address calculation cycle between the instruction execution cycles to recalculate the address.

JP-A-62-11939 discloses a method for improving an execution function of the BSM instruction and the BASSM instruction by omitting the recalculation of the address. In this method, when the instruction decoded in the preexecution cycle is the BSM instruction or the BASSM instruction, branch addresses for the respective modes are calculated in the preexecution cycle, and one of the precalculated addresses is selected in accordance with the address mode which is set in the PSW in the execution cycle of the instruction and it is used as the branch address for the new address mode.

In the prior art method, the branch addresses for both the 24-bit address and the 31-bit address are calculated in the preexecution cycle independently from the address mode bit of the current PSW, and after the address mode has been determined in the execution cycle of the instruction, one of the addresses is selected to determine the branch destination address. Accordingly, fetching of a branch destination instruction cannot be started until the address mode is determined and the correct branch destination address is determined.

SUMMARY OF THE INVENTION

It is an object of the present invention to provide a data processing unit having an instruction precontrol function which calculates an address of a branch destination instruction in accordance with an address mode represented by a specific bit of a general purpose register designated by a mode set/branch instruction such as a BSM instruction or a BASSM instruction in a preexecution cycle of the instruction, and starts fetching of a branch destination instruction based on the calculation result without waiting for an execution cycle of the instruction.

According to the present invention, the address is calculated in accordance with the address mode bit in the branch destination address data in the general purpose register designated by the register field of the instruction such as the BSM instruction or the BASSM instruction in the preexecution cycle of the instruction, and the fetching of the branch destination instruction is started by using the calculated address as the branch destination address without waiting for the execution cycle of the BSM instruction or the BASSM instruction.

The content of the bit 0 position of the general purpose register designated by the R2 field of the BSM instruction or the BASSM instruction is equal to the value set at the address mode bit of the PSW as the new address mode as a result of the execution of the instruction. Accordingly, the address calculated in the preexecution cycle of the BSM instruction or the BASSM instruction in accordance with the content of the bit 0 position of the general purpose register designated by the R2 field of the instruction is equal to the address calculated in the execution cycle of the instruction in accordance with the address mode bit of the PSW, and it represents the branch destination address in the new address mode. In this manner, the desired branch destination address can be determined in the preexecution cycle of the BSM instruction or the BASSM instruction, and the fetching of the branch destination instruction can be started in the preexecution cycle in accordance with the determined branch destination address.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

One embodiment of the present invention will now be explained with reference to the drawings.

Figure 1:
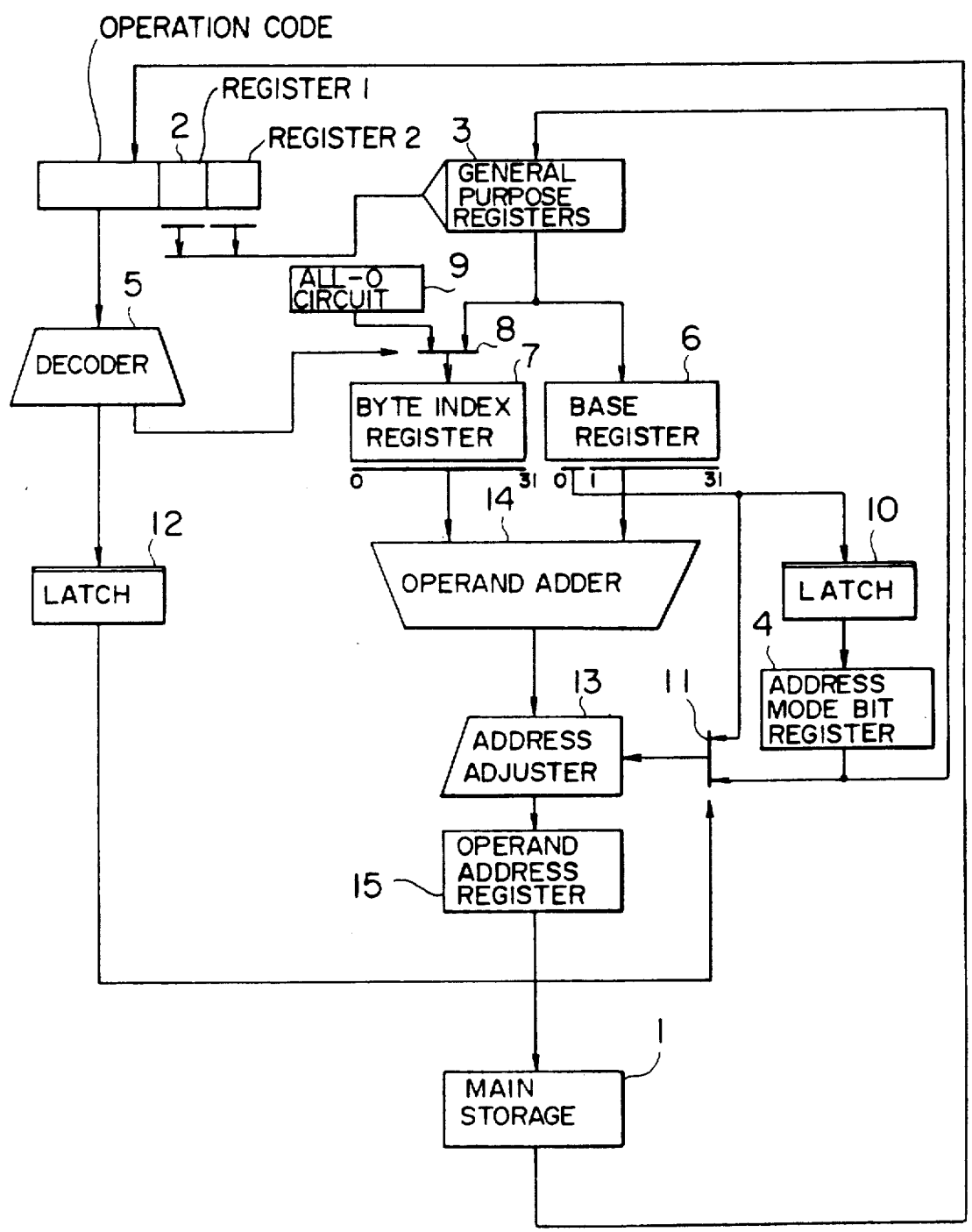
FIG. 1 shows a block diagram of a data processing unit of the present invention.
Figure 2:
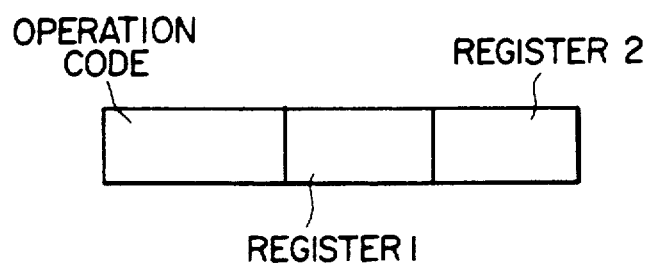
FIG. 2 shows a format of a BSM instruction and a BASSM instruction.

FIG. 1 shows a configuration of a data processing unit having an instruction precontrol function in accordance with the present invention. In FIG. 1, an instruction fetched from a main storage 1 is loaded into an instruction register 2. One of a plurality of general purpose registers designated by a register field of the register loaded in the instruction register 1 is accessed. An address mode bit of a current PSW is set in an address mode bit register 4. When a BSM instruction or a BASSM instruction is loaded into the instruction register 2 and an operation code of the instruction is decoded by a decoder 5, the content of the address mode bit register 4 is set into the bit 0 position of the general purpose register designated by the R1 field of the instruction. The content of the general purpose register designated by the R2 field of the instruction is loaded into a base register 6. The content of the general purpose register is normally loaded into a byte index register 7 through a selector 8, but when the BSM instruction or the BASSM instruction is decoded, the selection by the selector 8 is switched by the output of the decoder 5 so that a content of an all-zero circuit 9 is loaded into the byte index register 7. The content of the bit 0 position of the base register 6 represents the address mode to be set by the execution of the BSM instruction or the BASSM instruction, and it is loaded into the address mode bit register 4 through a latch 10 during an execution cycle of the instruction. A selection of a selector 11 is switched by the output of the decoder 5 through a latch 12. The latches 10 and 12 are provided to synchronize the information transfer among the elements in the unit. For example, the latch 12 is provided so that the output of the decoder 5 is supplied to the selector 11 when the content of the general purpose register designated by the R2 field of the general purpose register 3 is loaded into the base register 6, when an instruction other than the BSM instruction and the BASSM instruction is decoded, the selector 11 selects the content of the address mode bit register 4 by the output of the decoder 5, and when the BSM instruction or the BASSM instruction is decoded, the selector 11 selects the content of the bit 0 position of the base register 6 and supplies it to an address adjuster 13 as an address mode signal. An operand adder 14 adds the content of the base register 6 and the content of the byte index register 7, and the output of the operand adder 14 is adjusted by the address adjuster 13 in accordance with the address mode signal and it is then loaded into an operand address register 15 for use as an address to fetch the instruction from the main storage 1.

Figure 3:
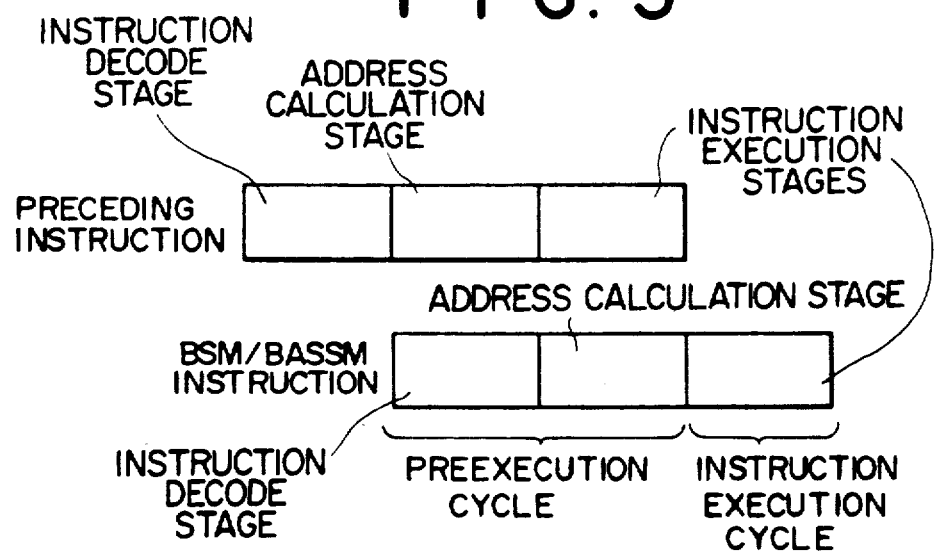
FIG. 3 shows a timing of a preexecution cycle and an instruction execution cycle.

The precontrol of the instruction is now explained. In the precontrol of the instruction, a succeeding instruction is preexecuted in overlap with the execution of a preceding instruction. A timing thereof is shown in FIG. 3, in which D represents an instruction decode stage, A represents an address calculation stage and E represents an instruction execution stage.

When the BSM instruction or the BASSM instruction is decoded by the decoder 5 in the preexecution cycle, the content of the general purpose register designated by the R2 field of the instruction is loaded into the base register 6, and zeros are loaded into the byte index register 7 by the all-zero circuit 9. The operand adder 14 adds all 0's of the bits 0-31 of the byte index register 7 and the bits 1-31 of the base register 6 (specifically, it simply passes the content of the base register 6) and supplies the sum to the address adjuster 13.

On the other hand, when the BSM instruction or the BASSM instruction is decoded in the preexecution cycle, the address mode switching signal supplied from the decoder 5 through the latch 12 is turned on. At this time, the selector 7 selects not the address mode bit 14 of the current PSW but the content of the bit 0 position of the base register 6 and supplied it to the address adjuster 13 as the address mode signal.

When the address mode signal is "0", the address adjuster 13 selects the content of the bits 8-31 of the data calculated in the operand adder 14 (which is equal to the content of the bits 8-13 of the base register 6) with the bits 0-7 being "0"s, and loads them into the operand address register 15. When the address mode signal is "1", the address adjuster 13 selects the content of the bits 1-31 of the data calculated in the operand adder 14 (which is equal to the content of the bits 1-31 of the base register 6) with the bit 0 position being "0", and loads them into the operand address register 15.

The content of the bit 0 position loaded to the base register 6 is one which is to be loaded into the address mode bit register 4 of the PSW as the final new address mode after the BSM instruction or the BASSM instruction has been executed in the instruction execution cycle. Accordingly, the content loaded to the operand address register 15 through the above operation represents the desired branch destination address which is determined by the address calculation based on the content loaded in the address mode bit register 4 as the new address mode as a result of the execution of the BSM instruction or the BASSM instruction. The branch destination address calculation for the BSM instruction or the BASSM instruction is carried out in the preexecution cycle prior to the determination of the new mode based on the value to be set as the new address mode, and the calculated address is loaded into the operand address register 15. Based on the content of the operand address register 15, the fetching of the branch destination instruction from the memory is started in the preexecution cycle.

While particular embodiments of the invention have been shown and described, it will be obvious to those skilled in the art that various changes and modifications may be made without departing from the present invention in broader aspects.

I claim:

1. A data processing unit having an instruction precontrol function comprising:
   a main storage;

an instruction register for storing an instruction fetched from said main storage;

a decoder for decoding an operation code of the instruction received from said instruction register;

a plurality of general purpose registers designated by field portions of said instruction register;

a byte index register to be set to all "0"s in accordance with a switching of an output from said decoder when a branch instruction is decoded in said decoder;

a base register for storing an address mode set by an execution of a branch destination instruction and an address indicating said main storage read from one of said general purpose registers when the branch instruction is decoded in said decoder;

an operand adder for adding bits stored in said byte index register and the address stored in said base register;

an address mode register loaded therein the address mode of the branch instruction supplied from said base register in an execution cycle of the branch instruction;

a selector responsive to the output of said decoder for selecting the address mode indicated in said base register when the branch instruction is decoded while selecting the address mode indicated stored in said address mode register when an instruction other than the branch instruction is decoded;

an address adjuster for adjusting added data from said operand adder so that bits of the added data with a bit "0" position being "0" are selected from the added data; and an operand address register for receiving the adjusted data from said address adjuster as an operand address to fetch the instruction from said main storage.

2. A data processing unit according to claim 1, wherein said branch instruction is an unconditional branch instruction.

3. A data processing unit according to claim 1, wherein said byte index register is normally set to the content of one of said general purpose registers through a selector, while set to all "0" in accordance with a switching by the output of said decoder when a branch instruction is decoded in said decoder.

4. A data processing unit according to claim 1, wherein said address adjuster for adjusting added data from said operand adder so that predetermined numbers of upper-ordered bits with predetermined numbers of lower-ordered bits being "0" are selected from the added data when an address mode signal is "0" indicated by said selector, and adjusting added data from said operand adder so that predetermined numbers of bits with a bit zero position being "0" are selected from the added data when an address mode signal is "1" indicated by said selector.

5. A method of precontrol in a data processing unit having an instruction precontrol function and a plurality of different address modes, the method comprising the steps of:

decoding an instruction loaded in an instruction register of said data processing unit by a processor;

when an instruction for new address mode setting, branch address generation and branching is decoded, said processor calculates a branch destination address in a preexecution cycle of the instruction while using an address mode of a branch destination address represented by a specific bit in operand data of the instruction as the address mode; and fetching a branch destination instruction based on the calculated branch destination address by said processor.

* * * * *